US008398021B2

(12) United States Patent
Koch et al.

(10) Patent No.: US 8,398,021 B2
(45) Date of Patent: Mar. 19, 2013

(54) COMPLIANT CROWN PANEL FOR AN AIRCRAFT

(75) Inventors: William J. Koch, Bellevue, WA (US); Donald P. Matheson, Redmond, WA (US)

(73) Assignee: The Boeing Company, Chicago, IL (US)

(*) Notice: Subject to any disclaimer, the term of this patent is extended or adjusted under 35 U.S.C. 154(b) by 986 days.

(21) Appl. No.: 11/682,818

(22) Filed: Mar. 6, 2007

(65) Prior Publication Data

US 2007/0164159 A1 Jul. 19, 2007

Related U.S. Application Data

(63) Continuation-in-part of application No. 11/335,275, filed on Jan. 19, 2006, now Pat. No. 7,766,277.

(51) Int. Cl.
*B64C 1/12* (2006.01)

(52) U.S. Cl. .......................... 244/119; 244/121; 244/133

(58) Field of Classification Search .................. 244/119, 244/120, 121, 129.1, 133; 52/630
See application file for complete search history.

(56) References Cited

U.S. PATENT DOCUMENTS

| | | | |
|---|---|---|---|
| 1,845,520 A | 2/1932 | Robinson | |
| 2,503,109 A * | 4/1950 | Harris | 343/705 |
| 2,739,047 A | 3/1956 | Sanz | |
| 2,937,597 A | 5/1960 | Winn et al. | |
| 3,002,567 A | 10/1961 | Stulen et al. | |
| 3,010,398 A | 11/1961 | Parlanti | |
| 3,117,751 A | 1/1964 | Rogers et al. | |
| 3,472,472 A | 10/1969 | Maestrello | |
| 3,674,227 A | 7/1972 | Jacobson et al. | |
| 3,912,380 A | 10/1975 | Klein | |
| 3,925,783 A | 12/1975 | Bleday et al. | |
| 4,073,985 A | 2/1978 | San Miguel | |
| 4,113,549 A * | 9/1978 | Brimm | 216/46 |
| 4,137,118 A * | 1/1979 | Brimm | 156/345.23 |
| 4,173,187 A | 11/1979 | Steverding | |
| 4,275,859 A | 6/1981 | Bleday | |

(Continued)

FOREIGN PATENT DOCUMENTS

| | | | |
|---|---|---|---|
| DE | 102004058013 B3 * | 7/2006 | |
| EP | 0387400 A2 | 9/1990 | |

(Continued)

OTHER PUBLICATIONS

PCT Search Report PCT/US06/47460, Jul. 13, 2007, The Boeing Company.

(Continued)

*Primary Examiner* — Benjamin P Lee
(74) *Attorney, Agent, or Firm* — Yee & Associates, P.C.

(57) ABSTRACT

An aircraft forward pressure bulkhead and an aircraft crown panel are described herein. The forward pressure bulkhead includes a malleable and deformable dome that is configured to "catch" foreign objects, such as birds. The dome is intentionally designed to deform in response to a foreign object strike that imparts at least a threshold amount of impact energy to the bulkhead. The dome is free of rigid stiffeners and non-deformable reinforcement members that would otherwise hinder the flexible characteristic of the dome. Practical embodiments of the bulkhead utilize fewer parts, are less heavy, and are less expensive than traditional bulkheads that utilize rigid stiffeners. The crown panel has similar compliant characteristics. The crown panel is designed to simultaneously deform and deflect in response to foreign object impacts such as birds and hail. The crown panel is formed from a monolithic one-piece material, such as aluminum, and various reinforcing features are integrally formed in the material.

21 Claims, 7 Drawing Sheets

U.S. PATENT DOCUMENTS

| | | | | |
|---|---|---|---|---|
| 4,757,962 | A | 7/1988 | Grant | |
| 5,062,589 | A | 11/1991 | Roth et al. | |
| 5,143,276 | A | 9/1992 | Mansbridge et al. | |
| 5,251,849 | A * | 10/1993 | Torres | 244/117 R |
| 5,262,220 | A * | 11/1993 | Spriggs et al. | 428/156 |
| 5,323,170 | A | 6/1994 | Lang | |
| 5,344,685 | A | 9/1994 | Cassell | |
| 5,457,471 | A | 10/1995 | Epperson, Jr. | |
| 5,542,626 | A | 8/1996 | Beuck et al. | |
| 5,662,293 | A | 9/1997 | Hower et al. | |
| 5,691,736 | A | 11/1997 | Hunn et al. | |
| 5,934,616 | A | 8/1999 | Reimers et al. | |
| 6,107,976 | A | 8/2000 | Purinton | |
| 6,114,050 | A | 9/2000 | Westre et al. | |
| 6,187,411 | B1 | 2/2001 | Palmer | |
| 6,213,426 | B1 | 4/2001 | Weber et al. | |
| 6,364,250 | B1 | 4/2002 | Brinck et al. | |
| 6,378,805 | B1 | 4/2002 | Stephan et al. | |
| 6,443,392 | B2 | 9/2002 | Weber et al. | |
| 6,518,936 | B1 | 2/2003 | Dull | |
| 6,568,632 | B2 | 5/2003 | Page et al. | |
| 6,627,296 | B1 | 9/2003 | Tudela et al. | |
| 6,684,593 | B2 * | 2/2004 | Brenneis et al. | 52/630 |
| 6,817,571 | B2 | 11/2004 | Retz et al. | |
| 7,025,305 | B2 | 4/2006 | Folkesson et al. | |
| 7,195,203 | B2 | 3/2007 | Livingstone et al. | |
| 7,384,015 | B2 | 6/2008 | Dazet et al. | |
| 7,566,489 | B2 | 7/2009 | Starke | |
| 7,686,249 | B2 | 3/2010 | Luttig et al. | |
| 7,735,779 | B2 * | 6/2010 | Griess et al. | 244/119 |
| 7,766,277 | B2 | 8/2010 | Anderson et al. | |
| 7,861,970 | B2 | 1/2011 | Griess et al. | |
| 7,931,233 | B2 | 4/2011 | Arafat et al. | |
| 7,997,529 | B2 | 8/2011 | Koch et al. | |
| 8,083,182 | B2 | 12/2011 | Cacciaguerra | |
| 2004/0035979 | A1 | 2/2004 | McCoskey, Jr. et al. | |
| 2004/0155148 | A1 | 8/2004 | Folkesson et al. | |
| 2006/0022088 | A1 | 2/2006 | Dazet et al. | |
| 2006/0237587 | A1 | 10/2006 | Luttig et al. | |
| 2007/0029443 | A1 | 2/2007 | Manz | |
| 2007/0095982 | A1 * | 5/2007 | Kismarton et al. | 244/119 |
| 2007/0138340 | A1 | 6/2007 | Arafat et al. | |
| 2007/0164152 | A1 | 7/2007 | Anderson et al. | |
| 2007/0164159 | A1 * | 7/2007 | Koch et al. | 244/121 |
| 2008/0105785 | A1 * | 5/2008 | Griess et al. | 244/120 |
| 2008/0149769 | A1 * | 6/2008 | Koch et al. | 244/121 |
| 2009/0101756 | A1 * | 4/2009 | Cacciaguerra | 244/119 |
| 2009/0294588 | A1 * | 12/2009 | Griess et al. | 244/121 |
| 2010/0038487 | A1 * | 2/2010 | Kolax et al. | 244/119 |
| 2011/0101164 | A1 | 5/2011 | Koch et al. | |

FOREIGN PATENT DOCUMENTS

| | | |
|---|---|---|
| EP | 1544104 A1 | 6/2005 |
| WO | 03000546 A2 | 1/2003 |
| WO | 2007084227 A2 | 7/2007 |
| WO | 2008109763 A2 | 9/2008 |

OTHER PUBLICATIONS

PCT Written Opinion PCT/US06/47460, Jul. 13, 2007, The Boeing Company.
International Search Report dated Aug. 6, 2009, regarding Application No. PCT/US2008-056077 (WO 2008109763), 4 pages.
USPTO Office Action, dated Apr. 4, 2008, regarding U.S. Appl. No. 11/335,275, 19 pages.
Preliminary Amendment, dated Jun. 3, 2008, regarding U.S. Appl. No. 11/335,275, 22 pages.
.Response to Office Action, dated Jun. 27, 2008, regarding U.S. Appl. No. 11/335,275, 17 pages.
USPTO Final Office Action, dated Oct. 2, 2008, regarding U.S. Appl. No. 11/335,275, 11 pages.
Response to Final Office Action, dated Dec. 30, 2008, regarding U.S. Appl. No. 11/335,275, 16 pages.
USPTO Office Action, dated Apr. 16, 2009, regarding U.S. Appl. No. 11/335,275, 17 pages.
Response to Office Action, dated Jul. 20, 2009, regarding U.S. Appl. No. 11/335,275, 25 pages.
USPTO Final Office Action, dated Nov. 23, 2009, regarding U.S. Appl. No. 11/335,275, 21 pages.
Response to Final Office Action, dated Jan. 19, 2010, regarding U.S. Appl. No. 11/335,275, 25 pages.
USPTO Notice of Allowance, dated May 27, 2010, regarding U.S. Appl. No. 11/335,275, 7 pages.
USPTO Office Action, dated Sep. 9, 2010, regarding U.S. Appl. No. 12/042,629, 11 pages.
Response to Office Action, dated Dec. 13, 2010, regarding U.S. Appl. No. 12/042,629, 21 pages.
USPTO Notice of Allowance, dated Apr. 14, 2011, regarding U.S. Appl. No. 12/042,629, 5 pages.
USPTO Office Action, dated Mar. 4, 2011, regarding U.S. Appl. No. 12/965,451, 17 pages.
Response to Office Action, dated May 17, 2011, regarding U.S. Appl. No. 12/965,451, 15 pages.
USPTO Final Office Action, dated Aug. 9, 2011, regarding U.S. Appl. No. 12/965,451, 14 pages.
Response to Final Office Action, dated Dec. 9, 2011, regarding U.S. Appl. No. 12/965,451, 17 pages.
USPTO Office Action, dated May 23, 2012, regarding U.S. Appl. No. 12/965,451, 26 pages.

* cited by examiner

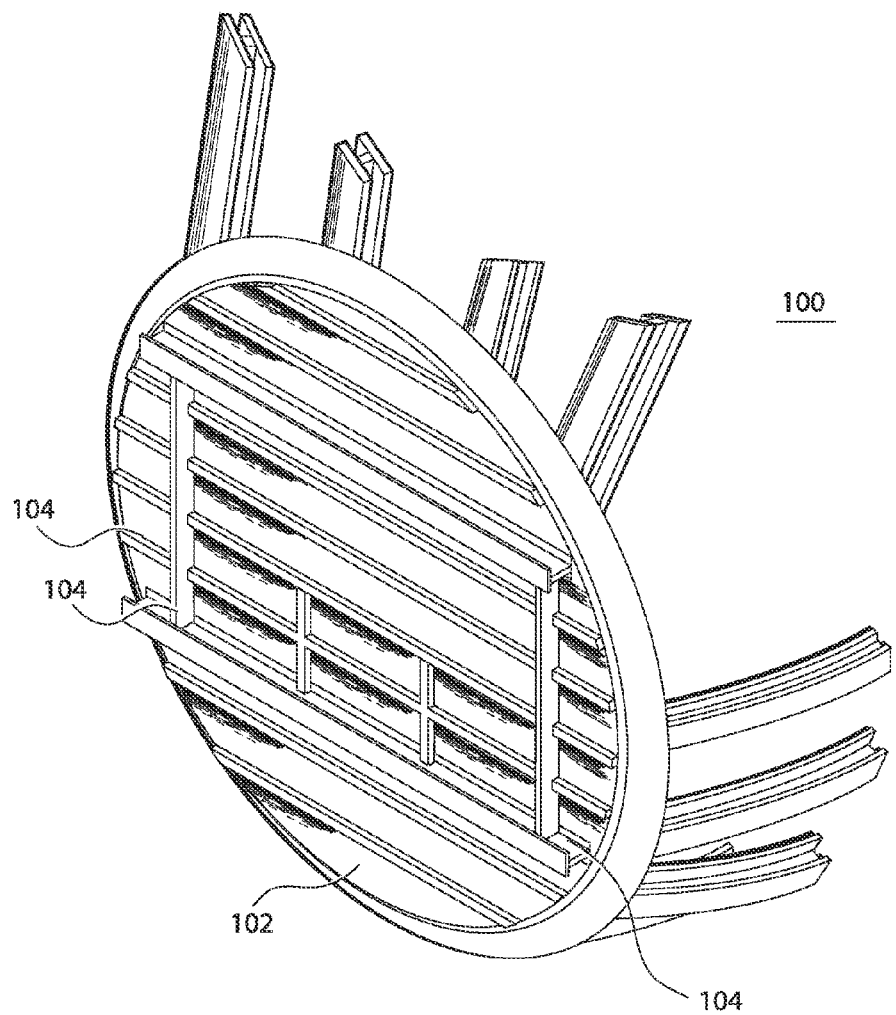
*FIG. 1-PRIOR ART*
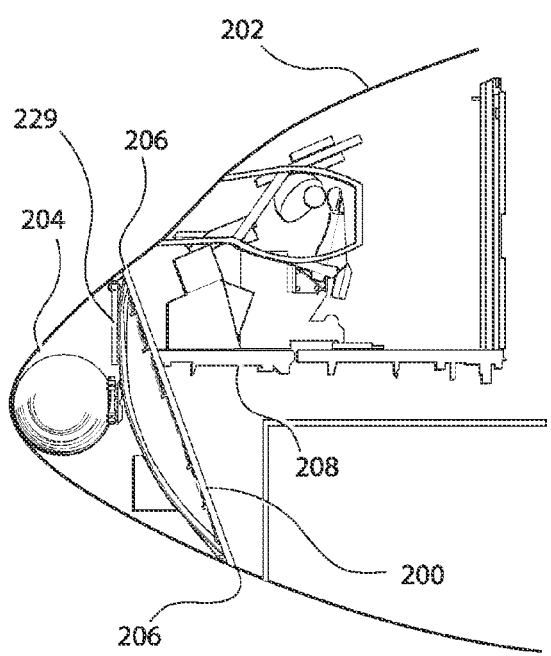
*FIG. 2*

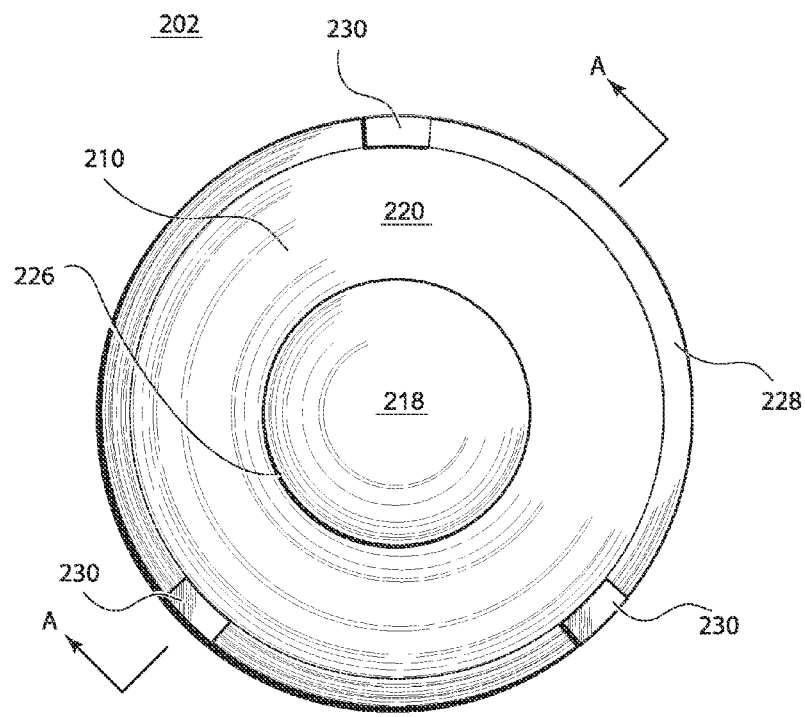
FIG. 5
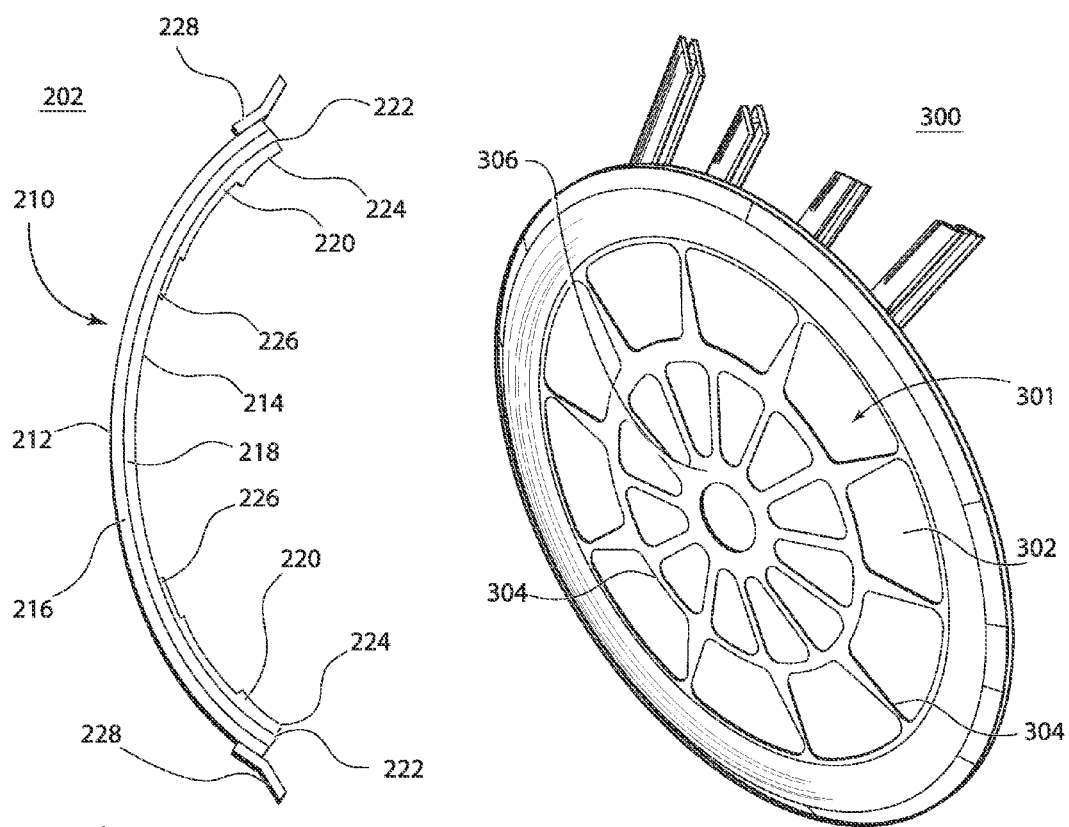
FIG. 6
FIG. 7

COMPLIANT CROWN PANEL FOR AN AIRCRAFT

CROSS-REFERENCE TO RELATED APPLICATION(S)

This application is a continuation-in-part of U.S. patent application Ser. No. 11/335,275, filed Jan. 19, 2006 now U.S. Pat. No. 7,766,277.

TECHNICAL FIELD

Embodiments of the subject matter described herein relate generally to aircraft structures. More particularly, embodiments of the subject matter relate to a compliant crown panel for an aircraft.

BACKGROUND

The forward pressure bulkhead in an aircraft is located at the nose of the fuselage, and it serves as a barrier for the pressurized interior cabin environment. The front side of the forward pressure bulkhead is typically surrounded by the radome or "nose cone" of the aircraft, which houses an antenna and/or other equipment for the aircraft. The inside of the radome is not pressurized, i.e., it is exposed to ambient air conditions. The radome is typically formed from a lightweight and electromagnetic transparent material such as fiberglass. Consequently, the forward pressure bulkhead is designed to provide additional protection against foreign objects, such as birds, which may strike the nose of the aircraft.

Conventional forward pressure bulkheads are designed to rigidly withstand impacts by providing a "brick wall" protection mode. In other words, conventional forward pressure bulkheads are engineered to resist bird penetration with very low structural deflection. In this regard, such forward pressure bulkheads utilize rigid reinforcement beams, ribs, or other components that support the main bulkhead panel. Therefore, such forward pressure bulkheads are typically fabricated from many separate components that are welded, riveted, or otherwise connected together to form the desired structure. The resulting structure can include a large parts count, which increases the cost of the forward pressure bulkhead. In addition, the resulting structure is, by design, structurally inefficient.

The crown panel of an aircraft is the area beginning above the cockpit windows and typically extending aft to a structural frame member of the aircraft. Like the forward pressure bulkhead, this area is prone to bird strike and in-flight hail due to its exposed location near the front of the fuselage. In this area there is a steep angle of incidence relative to the direction of flight (typically about 25 to 30 degrees). Conventional crown panels utilize substantial structure and frame elements designed to resist deflection and penetration by foreign objects. Consequently, prior art crown panel assemblies utilize heavy reinforcement beams, ribs, or other components that support the exposed crown panel skin. Moreover, such prior art crown panel assemblies may require a large parts count, which increases the material and manufacturing cost of the crown panel.

BRIEF SUMMARY

A compliant crown panel as described herein employs a malleable and deformable skin or panel in lieu of a rigid panel and frame structure. The primary section of the crown panel is designed to deform under the impact of a bird strike, thus absorbing and dissipating the impact energy. In an embodiment described herein, the crown panel is formed from a monolithic one-piece material such as aluminum. A reinforced perimeter and/or transverse reinforcing features are formed in the one-piece material by selectively removing material. Selective removal of material results in relatively thin areas that deform when subjected to lower impact forces, while the relatively thick areas define the reinforcing features. Some of these reinforcing features deform when subjected to higher impact forces. The embodiments of the crown panel described herein use fewer parts and are lightweight relative to conventional aircraft crown panels and panel support structure. For example, embodiments of the crown panel may be 60-80 pounds lighter than their traditional counterparts.

The above and other aspects may be carried out by an embodiment of an energy absorbing skin for an aircraft. The energy absorbing skin includes a malleable panel that is configured to deform in response to a threshold amount of impact energy caused by a foreign object strike, thus absorbing and dissipating at least a portion of the impact energy. The energy absorbing skin is void of any rigid non-deformable frame members.

The above and other aspects may be carried out by an embodiment of an energy absorbing crown panel for an aircraft having a cockpit window frame structure that includes at least one window post and an aft window frame support structure. The energy absorbing crown panel includes: a malleable panel that is configured to deform in response to a threshold amount of impact energy caused by a foreign object strike, thus absorbing and dissipating at least a portion of the impact energy; a forward edge reinforcing feature formed in the malleable panel, the forward edge reinforcing feature being configured for coupling to the aft window frame support structure; at least one transverse reinforcing feature formed in the malleable panel, and at least one transverse reinforcing feature being configured for alignment with the at least one window post.

The above and other aspects may be carried out by an embodiment of an energy absorbing skin for an aircraft. The energy absorbing skin includes: a malleable panel formed from a monolithic one-piece material having a nominal thickness, the malleable panel being configured to deform in response to a threshold amount of impact energy caused by a foreign object strike, thus absorbing and dissipating at least a portion of the impact energy; and at least one reinforcing feature formed in the monolithic one-piece material by selective removal of material and reduction of the nominal thickness near the at least one reinforcing feature.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 is a perspective front view of a prior art aircraft forward pressure bulkhead;

FIG. 2 is a schematic side view of an embodiment of a forward pressure bulkhead, as installed in an aircraft;

FIG. 5 is a rear view of the forward pressure bulkhead shown in FIG. 2;

FIG. 6 is a cross sectional view of the forward pressure bulkhead shown in FIG. 5, as viewed along line A-A;

FIG. 7 is a perspective front view of another embodiment of a forward pressure bulkhead;

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the sake of brevity, conventional techniques and features related to aircraft design, aircraft structures, aircraft manufacturing, and other aspects of aircraft bulkheads and crown panels (and the individual operating components of aircraft bulkheads and crown panels) may not be described in detail herein.

The following description refers to elements or features being "connected" or "coupled" together. As used herein, unless expressly stated otherwise, "connected" means that one element/feature is directly joined to (or directly communicates with) another element/feature, and not necessarily mechanically. Likewise, unless expressly stated otherwise, "coupled" means that one element/feature is directly or indirectly joined to (or directly or indirectly communicates with) another element/feature, and not necessarily mechanically.

FIG. 1 is a perspective front view of a prior art aircraft forward pressure bulkhead 100. Bulkhead 100 is installed at the front of an aircraft adjacent to an unpressurized nose radome. Bulkhead 100 maintains the pressurization inside the aircraft cabin while providing a measure of physical protection against strikes from foreign objects such as birds. In this regard, bulkhead 100 includes a generally flat and disk shaped face plate 102. Face plate 102 is designed to be rigid, non-deformable, and non-malleable, such that it provides a solid and "impenetrable" wall under normal flight conditions. Notably, face plate 102 is supported by a plurality of stiffening ribs 104, which provide rigid reinforcement to face plate 102. The stiffening ribs 104 are physically coupled to the exposed surface of face plate 102. Additional stiffening ribs (hidden from view) are also located on the opposite surface of face plate 102. These stiffening ribs 104 are intentionally designed to be non-deformable and non-malleable structural support members for bulkhead 100. In practical deployments, the use of stiffening ribs 104 adds to the overall parts count, expense, weight, and manufacturing complexity of bulkhead 100.

Figure 3:
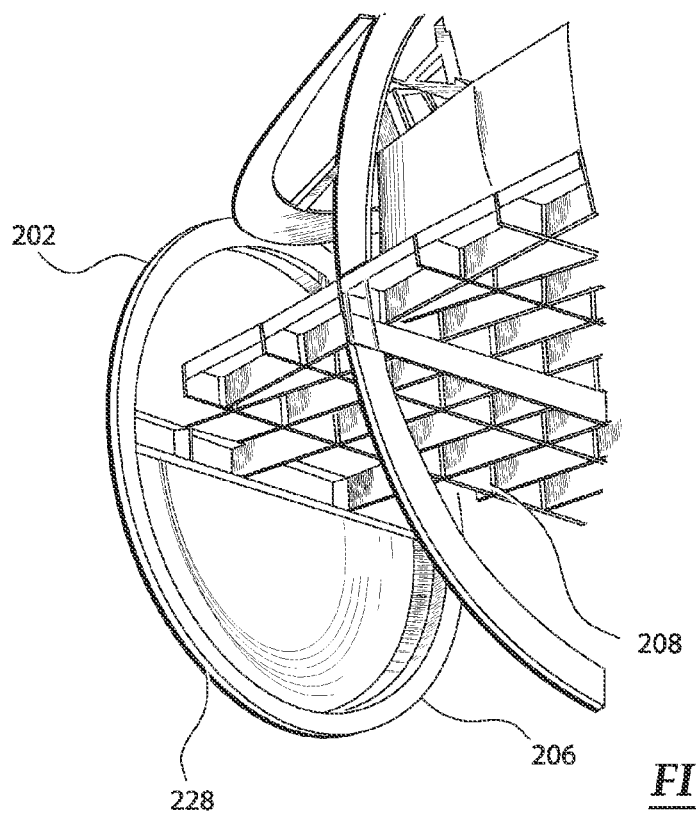
FIG. 3 is a schematic rear view of the forward pressure bulkhead shown in FIG. 2.
Figure 4:
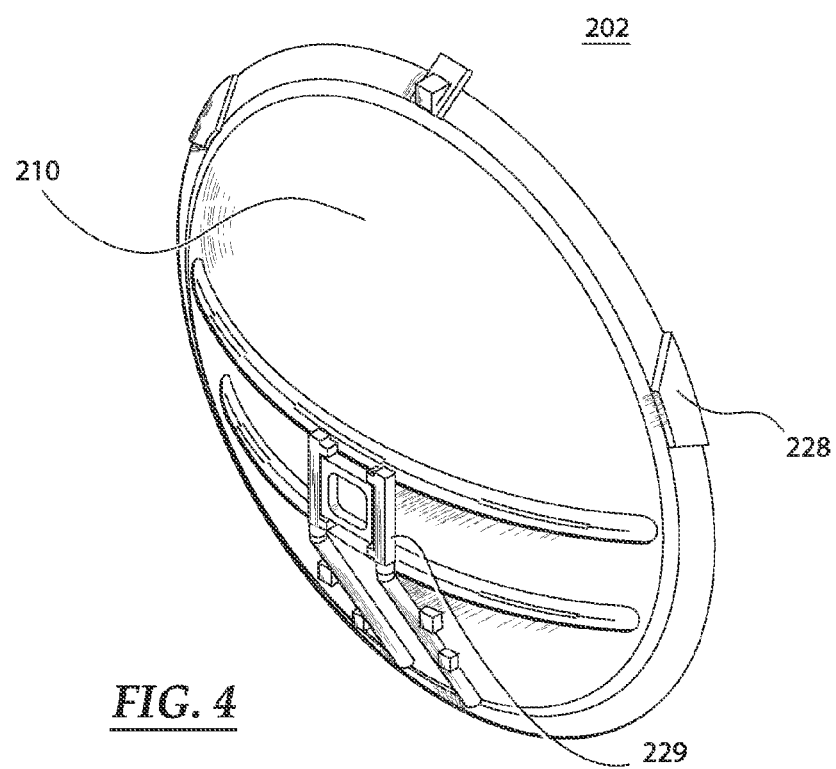
FIG. 4 is a perspective front view of the forward pressure bulkhead shown in FIG. 2.

FIG. 2 is a schematic side view of a forward pressure bulkhead 200 according to an example embodiment of the invention, as installed in an aircraft 202, FIG. 3 is a schematic rear view of forward pressure bulkhead 200, FIG. 4 is a perspective front view of forward pressure bulkhead 200, FIG. 5 is a rear view of forward pressure bulkhead 200, and FIG. 6 is a cross sectional view of forward pressure bulkhead 200 as viewed along line A-A in FIG. 5. Bulkhead 200 is generally configured to be used as a forward pressure bulkhead adjacent to an unpressurized nose radome 204 of aircraft 202. Bulkhead 200 is suitably configured to withstand pressure loading when the aircraft cabin is pressurized relative to ambient air pressure outside the aircraft. Bulkhead 200 leverages the natural characteristics of a dome shape to carry the pressure forces with a light malleable membrane rather than a heavy stiffened "panel and beam" structure as depicted in FIG. 1. The dome element is flexible enough to deform under the impact of a bird strike, thus absorbing and dissipating at least a portion of the impact energy through plastic deformation. This characteristic of bulkhead 200 addresses the need for a lightweight structure for airplane pressurization, while providing protection against foreign objects without resorting to the traditional "brick wall" approach. In practice, bulkhead 200 assumes a spherical shape that corresponds to the natural pressurization forces asserted by the cabin pressure. Thus, the dome of bulkhead 200 need only resist in a pure tensile mode, which it does in a very efficient manner. By being forgiving enough to "catch" a bird, but not allowing penetration, bulkhead 200 provides effective protection at the minor cost of a small amount of additional space needed to accommodate deflections. That additional space is also balanced to some degree by the space required to accommodate stiffeners in the traditional approach.

FIG. 2 depicts a typical installation location for bulkhead 200. In this example embodiment, bulkhead 200 is slightly canted in a forward direction relative to the front of aircraft 202. For this example installation, bulkhead 200 may be canted approximately 5-7 degrees relative to a vertical plane. Canting the dome allows for greater energy absorption by allowing the bird to spread over a larger area, but is not a necessary feature of the invention. The bulkhead 200 is coupled with an outer chord 206. The purpose of the outer chord 206 is to react the tension load due to pressurization of the bulkhead membrane through hoop compression in the ring. In other embodiments, the pressure load may be reacted by the dome itself or other parts of the aircraft structure. In practice, bulkhead 200 may be coupled to support and/or frame structures of aircraft 202 such that the outer chord 206 of bulkhead 200 remains stationary. For example, bulkhead 200 may be attached to a rigid frame 208 that provides an interface between bulkhead 200, the crew floor, radome 204, and the aircraft skin. Frame 208 may be formed from any suitable material, such as aluminum. In the example embodiment, frame 208 is realized as a monolithic sub-structure that is machined from a single piece of three inch thick aluminum plate. The specific design, configuration, and composition of frame 208 can vary to suit the needs of the given aircraft.

Referring to FIGS. 4-6, bulkhead 200 generally includes a malleable dome 210 that is suitably configured to deform in response to a threshold amount of impact energy caused by a foreign object strike. In this manner, dome 210 can absorb and dissipate at least a portion of the impact energy and, in practical embodiments, virtually all of the bird energy required for FAA certification, the residual being absorbed by the underlying aircraft structure. Notably, bulkhead 200 and dome 210 are void of any rigid non-deformable reinforcement members (in contrast to conventional designs that utilize stiffener members). Moreover, dome 210 includes no holes or penetrations other than fastener locations near the perimeter edge of bulkhead 200. In the example embodiment, dome 210 is formed from an aluminum alloy, such as 2024-T3 aluminum. Of course, dome 210 may be formed from other suitable materials, alloys, and compositions, including KEVLAR, SPECTRA, ZYLON, fiberglass, thermoplastics such as PEEK and PEKK, or virtually any practical material. Material with higher plastic strain to failure and higher strength will typically absorb more energy, but bulkhead 200 may be configured to allow for significant energy absorption through elastic as well as plastic deflection of the dome 210. In practice, dome 210 can be generally shaped as a spherical cap (i.e., a section of a spherical shell) having a convex front surface 212 and a concave aft surface 214. In this example, dome 210 is formed with a spherical radius of approximately 120 inches, the diameter at the base of dome 210 is approximately 85.4 inches, and the depth of dome 210 is approximately eight inches. Dome 210 is configured to withstand pressurized air loading applied to concave aft surface 214 relative to ambient air pressure exposed to convex front surface 212. Such differential pressure conditions occur during normal operation of the aircraft.

Dome 210 may be formed from a single sheet of material. Multiple layers are not a necessary feature of the invention, in practical embodiments, however, dome 210 is realized as a multilayered component to provide a failsafe measure for bulkhead 200. In this example, dome 210 includes a first full layer 216, a second full layer 218 coupled to first full layer 216, and a partial layer 220 coupled to second full layer 218. The layers can be attached together using any suitable mechanism or technique, such as cold bonding, hot bonding, mechanical fasteners, welding, clamps, or the like. The first and second layers are "full" relative to partial layer 220, which does not span the entire surface of dome 210. In other words, the first and second layers are "redundant" layers because they each generally define a spherical cap. Partial layer 220, however, generally defines a truncated spherical cap, or a ring shaped layer having a spherical contour. Dome 210 includes an outer perimeter 222 that is generally defined by its circular edge. As shown in FIG. 5 and FIG. 6, partial layer 220 is located around outer perimeter 222. In other words, partial layer 220 forms a ring layer that circles the periphery of second full layer 216. Thus, the exposed outer surface of first full layer 212 represents convex front surface 212, while the exposed outer surface of second full layer 218, along with the exposed outer surface of partial layer 220, represents concave aft surface 214. Thus, first full layer 216 generally corresponds to the front side of bulkhead 200, and partial layer 220 generally corresponds to the aft side of bulkhead 200.

First full layer 216, second full layer 218, and partial layer 220 are each formed from a ductile and deformable material, which facilitates the impact energy absorbing and dissipating properties of bulkhead 200 as described above. In one practical embodiment, first full layer 216 and second full layer 218 are each formed from a sheet of aluminum that is approximately 0.063 inch thick. In particular, these full layers may be formed from a seamless sheet of 2024-T3 aluminum alloy. Partial layer 220 may also be formed from a seamless sheet of 2024-T3 aluminum alloy. In the example embodiment, partial layer 220 has a variable thickness that decreases towards the center of dome 210. For ease of manufacturing, the variable thickness may (but need not be) be formed in discrete steps, as depicted in FIG. 6. In this regard, partial layer 220 has an outer edge 224 located toward outer perimeter 222, and an inner edge 226 located toward the center of dome 210. Inner edge 226 is approximately 14-17 inches from outer edge 224 in this embodiment (in one practical embodiment, partial layer 220 is about 15.7 inches wide). Outer edge 224 may have a thickness of approximately 0.125 inch, and inner edge 226 may have a thickness of approximately 0.031 inch. In practice, partial layer 220 may include any number of intermediate steps having decreasing thicknesses between outer edge 224 and inner edge 226. The relatively thick portion of dome 210 near outer perimeter 222 is desirable to provide additional strength for mounting of bulkhead 200. The variation in shell thickness of dome 210 also provides additional resistance to impact stresses near the edge of dome 210. Stresses are higher toward the edge due to reduced compliance of the dome 210 in those areas.

Dome 210 (and any layer thereof) may be formed using any suitable manufacturing technique. For example, dome 210 may be manufactured using a bulge forming technique that applies pressure to a flat sheet to shape the spherical cap. Alternatively, dome 210 may be manufactured using a spin forming technique that rotates a flat sheet while applying pressure with a forming tool to create a dished shape. Dome 210 may also be formed using stamping, stretch forming, or pressing techniques.

Bulkhead 200 also includes an outer chord 228 that is coupled to dome 210 around outer perimeter 222. In this embodiment, the outer chord 228 is composed of multiple segments of 7075 T73 aluminum formed such that its cross section is an angle formed by one leg that matches the contour of the dome 210 and a secondary leg that matches the contour of the fuselage. The purpose of the angle is to integrate the dome 210 to the fuselage and to lend stiffness to the outer chord 228 such that it resists compression loads caused by membrane tension in the dome 210.

Outer chord 228 is suitably configured to provide a rigid attachment mechanism for bulkhead 200. Referring again to FIG. 2 and FIG. 3, outer chord 228 can be utilized to attach bulkhead 200 to frame 208, a windshield support, and/or other structures of aircraft 202. Outer chord 228 may also be configured to accommodate attachment of the aircraft fuselage skin. As depicted in FIG. 2 and FIG. 4, outer chord 228 may also provide attachment points for an antenna support assembly 229. Notably, antenna support assembly 229 need not be attached to dome 210 itself. Rather, antenna support assembly 229 preferably forms a "bridge" over dome 210. Indeed, bulkhead 200 is preferably configured such that no rigid stiffeners or reinforcement members are directly attached to either side of dome 210, thus making dome 210 free to deflect and deform in response to a foreign object strike.

In a practical embodiment, outer chord 228 can be formed from any suitable material, for example, aluminum alloy 7075-T7351 or aluminum alloy 7050-T7451. For ease of manufacturing and assembly, outer chord 228 may be realized as a segmented component that is spliced together. FIG. 5 shows outer chord 228 in three segments joined by three splicing elements 230. Outer chord 228 is coupled to dome 210 using suitable fasteners or fastening techniques, such as bolts, rivets, clamps, bonding, welding, or the like. In turn, bulkhead 200 is coupled to aircraft 202 (via outer chord 228) using suitable fasteners or fastening techniques, such as bolts, rivets, clamps, bonding, welding, or the like.

An aircraft forward pressure bulkhead configured in accordance with an alternate embodiment of the invention may employ at least one malleable and deformable tear strap layer coupled to a malleable dome (as described above). In other embodiments the tear strap layer could also be composed of malleable or deformable stiffeners. The malleable and deformable tear strap layer or stiffener layer is configured to retard fatigue and dynamic crack growth of the malleable dome while remaining flexible enough to accommodate the impact energy absorbing and dissipating characteristics of the bulkhead. FIG. 7 is a perspective front view of a forward pressure bulkhead 300 according to one such alternate embodiment. Bulkhead 300 shares a number of features with bulkhead 200; such common features and aspects will not be redundantly described herein. Bulkhead 300 includes a malleable dome 301 having at least a first full layer 302 and at least one malleable and deformable tear strap layer 304 coupled to full layer 302. In this example embodiment, bulkhead 300 includes a web layer 306 coupled to full layer 302, where the at least one tear strap layer 304 is defined by web layer 306. In other words, web layer 306 includes tear strap layer 304, thus resembling a spider web. Web layer 306 itself is deformable and malleable, which enables bulkhead 300 to absorb and dissipate impact energy in the manner described above. Thus, web layer 306 may be employed to enhance the structural integrity of bulkhead 300 in a forgiving manner in contrast to prior art techniques that rely on a rigid, non-deformable, "brick wall" configuration.

A practical embodiment of the aircraft forward pressure bulkhead described herein is designed to withstand a strike from a four pound object traveling at cruise velocity (Vc) at sea level or 0.85 Vc at 8000 feet, whichever is critical, as required by Federal Aviation Regulation §25.571. This and other embodiments of the invention may withstand differing bird weights and velocities depending on the requirement. In practice, the bulkhead has a threshold impact energy rating that determines whether the bulkhead dome will deform and deflect in response to the impact. The curved and angled surface of the bulkhead increases the likelihood that objects will deflect away from the dome. If an object strikes the bulkhead without imparting at least that threshold impact energy, then the object will either bounce off of the dome or deflect away from the dome. Under such conditions, the dome may temporarily deflect inward then snap back to its original shape. If, however, an object strikes the bulkhead with at least the threshold impact energy, then the dome will "catch" the object, deflect inward, and deform in a manner that absorbs and dissipates the impact energy. In this regard, the dome buckles under the impact force of the object, which travels a short distance in the aft direction after contact with the dome. The malleable nature of the dome enables the bulkhead to dissipate the impact force over a longer impact time (relative to rigid and stiff bulkheads). The dome may remain in a buckled or bent shape after impact, or it may snap back to its original shape. If the internal pressure does not restore the original shape of the bulkhead, it may then be restored by physical manipulation, or it may be replaced depending upon the severity of the deformation. The simple construction, light weight, and relatively low cost of the bulkhead enable such bulkheads to be sacrificial components.

The general characteristics of the compliant bulkhead described above may also be realized using other energy absorbing skins or panels of an aircraft, such as a crown panel. The basic function of an aircraft crown panel is to contain pressure and provide resistance against in-flight bird and hail hazards. The crown panel embodiments described herein perform this basic function at a reduced weight and cost relative to conventional crown panels and supporting structure. These benefits are derived from the use of a malleable domed panel that is designed to deform after a threshold amount of impact energy is applied. The resulting deflections are very large relative to conventional crown panels—one or two orders of magnitude larger. The larger deflection effectively reduces the applied impact force since energy is a function of force times deflection.

The crown panels described herein are designed to withstand foreign object strikes through large deflections that reduce the force impulse and stagnation pressure on the structure. In practice, three physical effects are at work. First, the impact energy is absorbed over a longer deflection stroke, so the peak force of the impulse is lower. Second, a bird will have time to spread out, which reduces stagnation pressure at the end of the stroke—since the crown panel is compliant, very little reaction occurs at the boundary until the end of the stroke (for a center impact), and at the end of the stroke the reaction forces are spread around a large portion of the perimeter of the panel rather than at the nearest adjacent frame/stringer members. Third, part of the initial energy is absorbed through flexure of the material but some is also absorbed by the acceleration of the target mass (for center impacts), and the initial energy eventually unwinds at the boundary but the effect is to reduce the peak impulsive force.

The crown panels described herein are simple in form relative to conventional crown panel designs. In lieu of the traditional skin and associated stiffening members, a crown panel as described herein employs a lofted panel having a reinforced boundary. The crown panel is preferably formed such that it has a tapered and non-uniform cross section that is thinner toward the center of the panel. For the illustrated embodiment, the non-uniform cross section may be created using chemical milling processes. For fail-safety, a crown panel may include a system of tear straps or a bonded second membrane (not shown). The tear straps allow crack arrestment without the added stiffness of frames or stringers so that malleability and the compliant nature of the crown panel is maintained.

Figure 8:
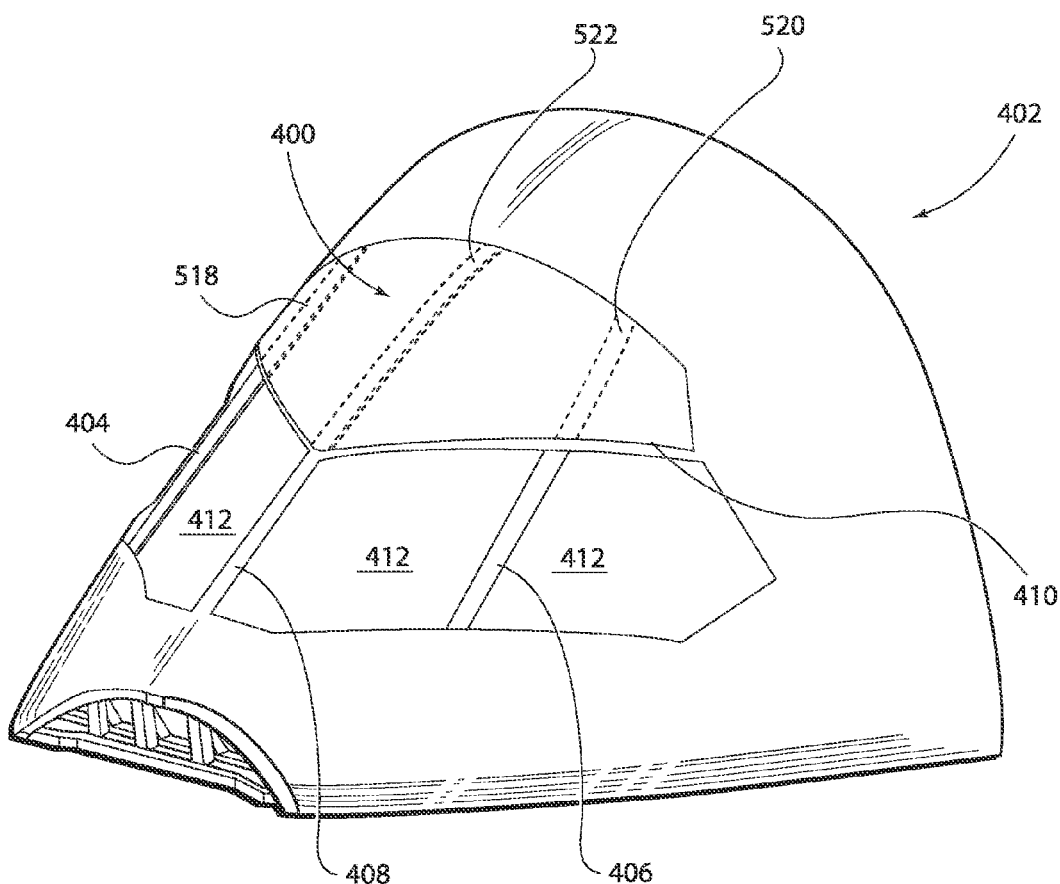
FIG. 8 is a perspective front view of an embodiment of a compliant crown panel, as installed on an aircraft.
Figure 9:
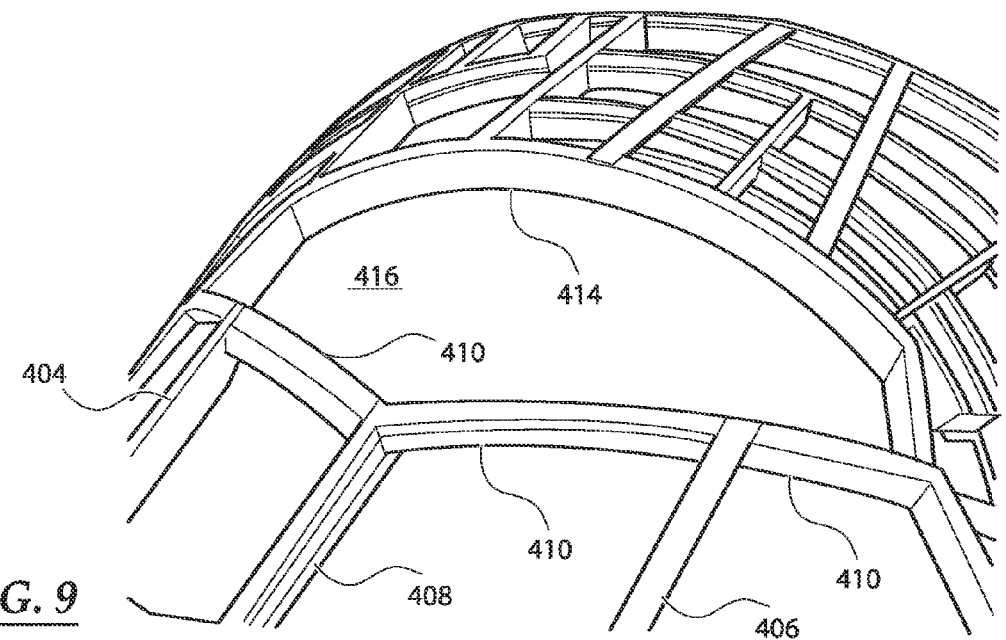
FIG. 9 is a perspective front view of support and frame structures near the installation location of the compliant crown panel shown in FIG. 8.

FIG. 8 is a perspective front view of an embodiment of a compliant crown panel 400 as installed on an aircraft 402, and FIG. 9 is a perspective front view of support and frame structures near the installation location of crown panel 400. For clarity, crown panel 400 is not shown in FIG. 9. FIG. 8 depicts the portion of aircraft 402 near the cockpit (see also FIG. 2). This particular embodiment of aircraft 402 utilizes a cockpit window frame structure that includes a right (starboard) window post 404, a left (port) window post 406, a center window post 408 between right window post 404 and left window post 406, and an aft window frame support structure 410. These elements of the cockpit window frame structure may be formed from aluminum, titanium, or any suitable material having the necessary structural properties. These elements facilitate mounting of cockpit windows 412 to aircraft 402.

For this example, crown panel 400 is located between aft window frame support structure 410 and another frame support structure 414 of the aircraft (see FIG. 9). In this regard, crown panel 400 may include integral reinforcing features that are suitably configured for coupling to aft window frame support structure 410, frame support structure 414, and/or other mounting elements of aircraft 402. In practice, the boundary of crown panel 400 is formed to be stiffer than the main section of crown panel 400 to resist impact through strength rather than compliance. This characteristic is desirable for the boundary, which serves as a junction between the compliant section of crown panel 400 and the rigid aircraft support structures. Moreover, the boundary may require additional strength to accommodate fasteners for crown panel 400.

Crown panel 400 spans a section of aircraft 402 having a relatively steep angle of incidence relative to the direction of travel, while the section of aircraft 402 behind frame support structure 414 has a relatively low angle of incidence, thus making it less susceptible to bird strike damage. Notably, crown panel 400 need not (and preferably does not) include or utilize any heavy, rigid, and non-deformable frame members, which are characteristic of conventional crown panel designs. Referring to FIG. 9, the space 416 between aft window frame support structure 410 and frame support structure 414 is void of any structural support members for crown panel 400. In contrast, conventional crown panels would require a "web" of rigid and stiff cross members in space 416; this web serves as a structural backing for the conventional crown panel skin, and this web is designed such that the conventional crown panel functions like a rigid "wall" to resist deformation or penetration by foreign objects. In practical deployments, the use of this stiffening web adds to the overall parts count, expense, weight, and manufacturing complexity of the crown panel and the aircraft.

The support elements depicted in FIG. 9 have been simplified to illustrate that crown panel 400 need not be supported or backed by any rigid structural stiffening members. In practice, aircraft 402 may include support elements within space 416, where such support elements are utilized for aircraft systems and hardware. Thus, equipment that might otherwise be mounted to or behind a conventional crown panel is remounted on the surrounding aircraft structure and far enough from crown panel 400 panel to avoid damage to sensitive or critical components. Such equipment supporting elements are not shown in the figures because they are unrelated to the configuration or operation of crown panel 400.

Figure 10:
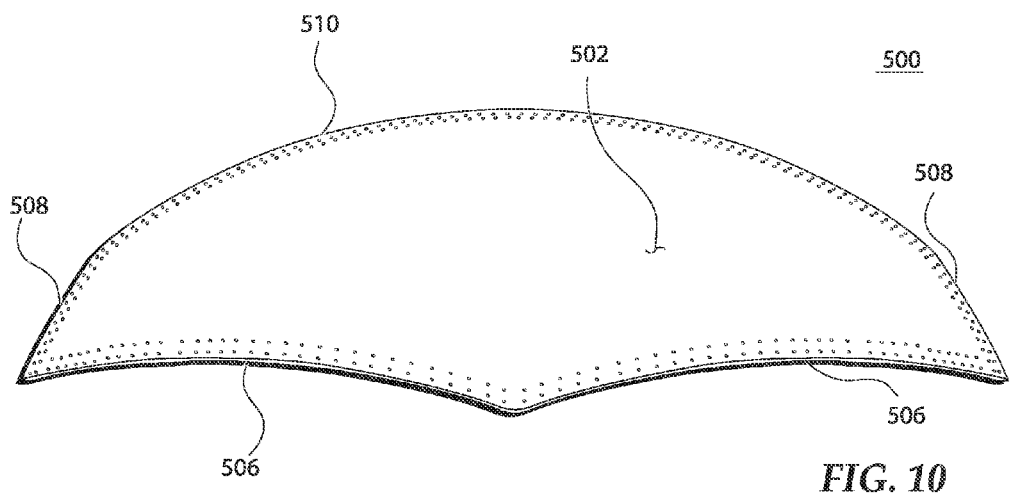
FIG. 10 is a front view of an embodiment of a compliant crown panel.
Figure 11:
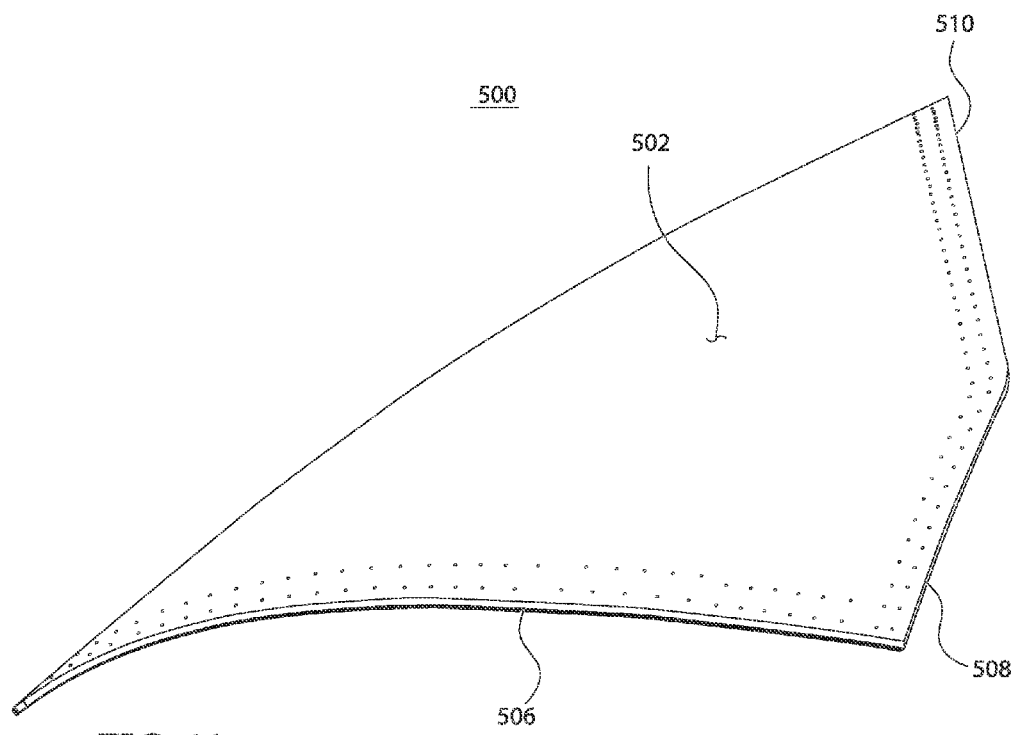
FIG. 11 is a side view of the compliant crown panel shown in FIG. 10.
Figure 12:
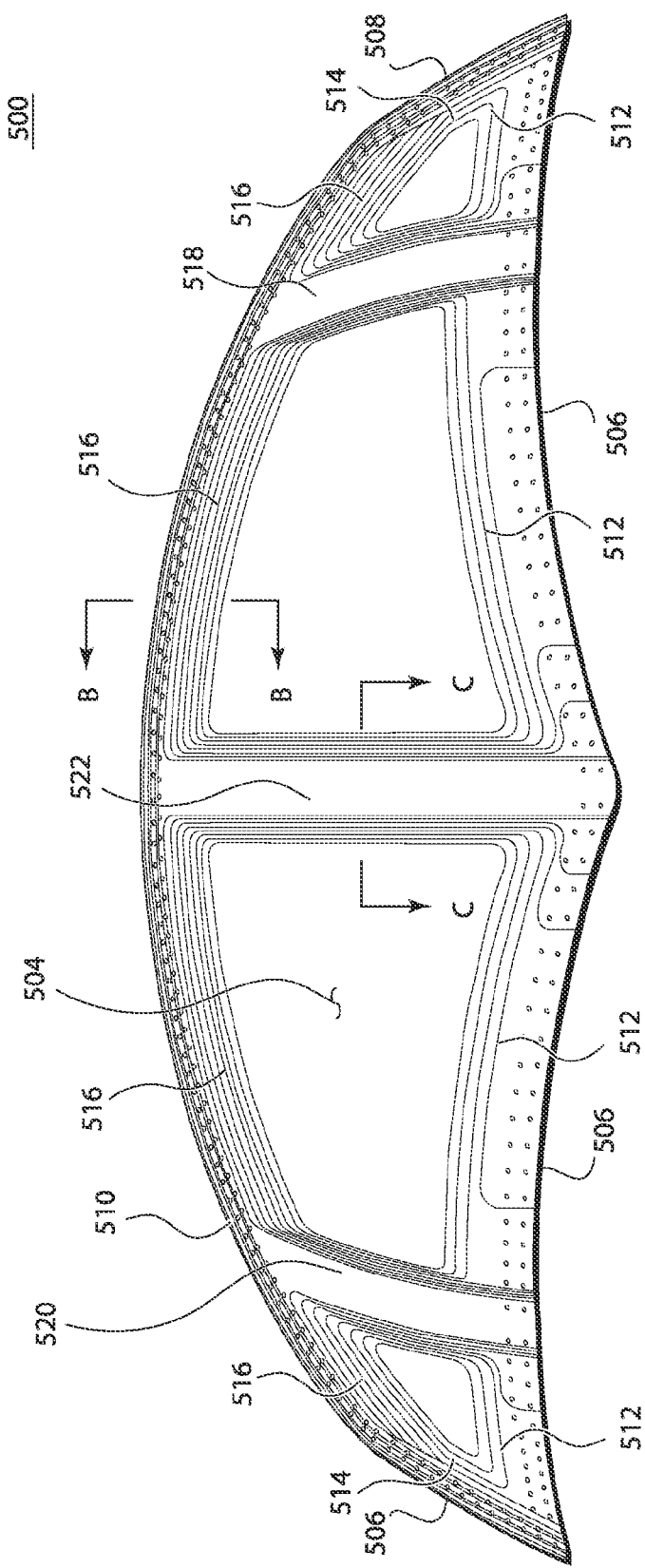
FIG. 12 is a rear view of the compliant crown panel shown in FIG. 10.
Figure 13:
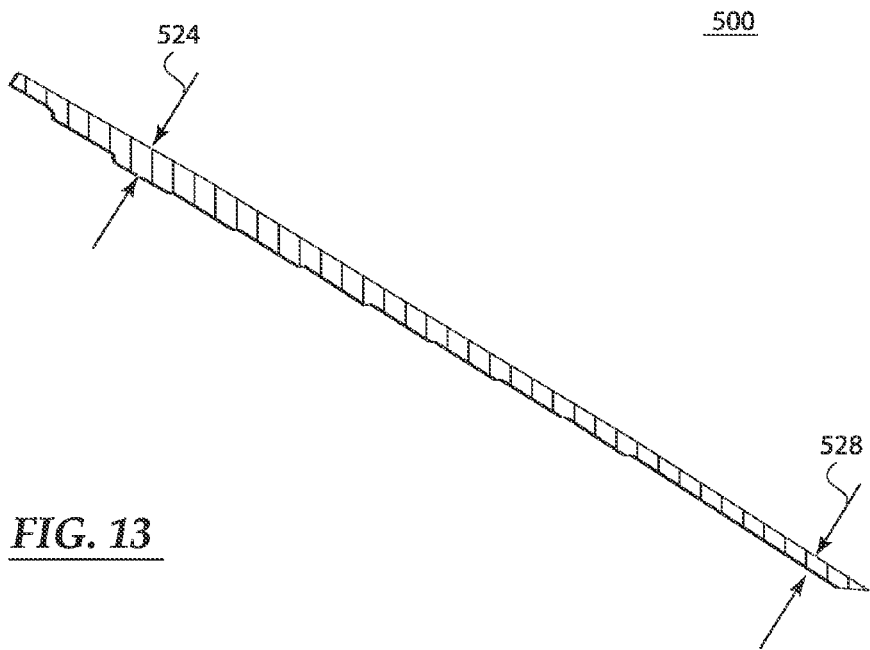
FIG. 13 is a cross sectional view of the compliant crown panel as viewed from line B-B in FIG. 12.
Figure 14:
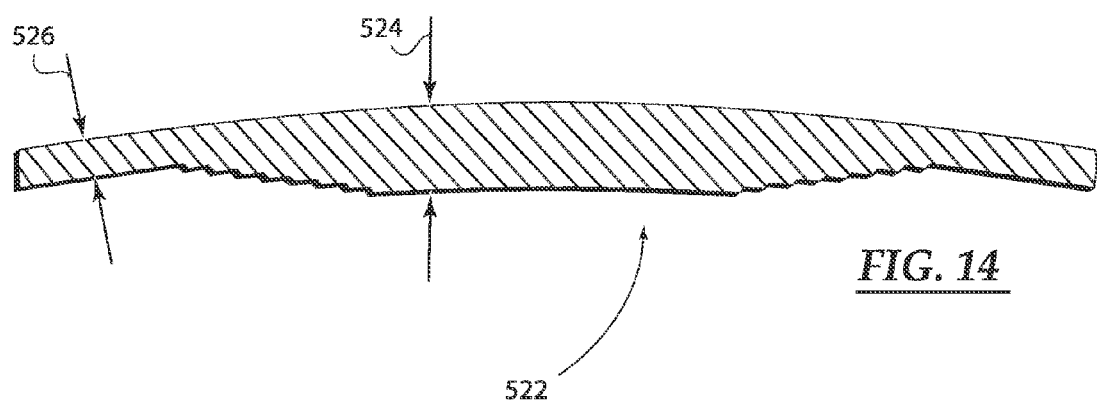
FIG. 14 is a cross sectional view of the compliant crown panel as viewed from line C-C in FIG. 12.

FIG. 10 is a front view of an embodiment of a compliant crown panel 500, FIG. 11 is a side view of crown panel 500, FIG. 12 is a rear view of crown panel 500, FIG. 13 is a cross sectional view of crown panel 500 as viewed from line B-B in FIG. 12, and FIG. 14 is a cross sectional view of crown panel 500 as viewed from line C-C in FIG. 12. For compatibility with one aircraft deployment, crown panel 500 has a width of about 100 inches (the longest dimension in FIG. 10 or FIG. 11) and a fore-aft length of about 57 inches (the dimension of the "peak" of crown panel 500, which is best shown in FIG. 11).

Crown panel 500 is one example of an energy absorbing skin suitable for an aircraft. Crown panel 500 is suitably configured to withstand pressure loading when the aircraft cabin is pressurized relative to ambient air pressure outside the aircraft. Crown panel 500 leverages the natural characteristics of a concave shape to carry the pressure forces with a light malleable membrane rather than a heavy stiffened "panel and beam" structure as utilized by conventional crown panels. Indeed, preferred embodiments of crown panel 500 are void of any rigid non-deformable frame members. Crown panel 500 is flexible enough to deform under the impact of a bird (or other foreign object) strike, thus absorbing and dissipating at least a portion of the impact energy through elastic and plastic deformation. More specifically, crown panel 500 is suitably configured to deform in response to a threshold amount of impact energy caused by a foreign object strike, thus absorbing and dissipating at least a portion of the impact energy. This characteristic of crown panel 500 addresses the need for a lightweight structure for airplane pressurization, while providing protection against foreign objects without resorting to the traditional "rigid wall" approach. In practice, crown panel 500 is compliant enough to simultaneously deform and deflect upon a bird strike, without allowing penetration.

Referring to FIGS. 10-12, crown panel 500 has a generally convex outer surface 502 and a generally concave inner surface 504 (see FIG. 8, which illustrates the overall contour of crown panel 400). For the illustrated deployment, convex outer surface 502 represents an exterior surface of the aircraft and, therefore, convex outer surface 502 is preferably smooth and seamless. Concave inner surface 504 may be subjected to interior cabin pressure established by the aircraft. In this regard, crown panel 500 is suitably configured to withstand pressurized air loading applied to concave inner surface 504 relative to ambient air pressure that is exposed to convex outer surface 502. As described in more detail below, concave inner surface 504 includes a number of features formed therein.

Crown panel 500 generally includes, without limitation: an outer perimeter defined at least in part by a forward edge 506, side edges 508, and an aft edge 510; a forward edge reinforcing feature 512; side edge reinforcing features 514; an aft edge reinforcing feature 516; a right (starboard) transverse reinforcing feature 518; a left (port) transverse reinforcing feature 520; and a center transverse reinforcing feature 522. For this embodiment of crown panel 500, the various reinforcing features are integrally formed in crown panel 500. In other words, these reinforcing features need not be realized as separate and distinct physical elements, and crown panel 500 can be manufactured without assembling multiple parts together.

This embodiment of crown panel 500 is configured as a malleable and deformable panel that is formed from a monolithic one-piece material (other embodiments may utilize more than one piece). As depicted in FIG. 10, the one-piece nature of crown panel 500 results in a seamless malleable panel having a smooth outer surface. The material used to manufacture crown panel 500 may be, for example, titanium, aluminum, a metal alloy, an epoxy-graphite composite, an epoxy-fiberglass composite, a thermoplastic-graphite composite, a thermoplastic-fiberglass composite, or the like. In one practical embodiment, crown panel 500 is formed from 2024-T3 or 2024-T42 aluminum stock. Although any suitable material can be used, 2024-T3 aluminum is preferred in impact areas due to its high strain-to-failure characteristics, fatigue resistance, and low cost. In practice, the monolithic material used for crown panel 500 initially has a nominal and uniform thickness before machining or chemical milling, which also represents the maximum thickness of crown panel 500 after machining or chemical milling. In this example, the nominal thickness is about 0.375 inches. Reference number 524 in FIG. 13 and FIG. 14 represents this nominal thickness.

Right transverse reinforcing feature 518, left transverse reinforcing feature 520, and center transverse reinforcing feature 522 are integrally formed in the monolithic one-piece material used for crown panel 500. The transverse reinforcing features are formed in the concave inner surface 504 of crown panel 500. Each transverse reinforcing feature is preferably formed such that it remains malleable and deformable when subjected to the anticipated impact energy caused by a foreign object strike. In other words, these transverse reinforcing features are intentionally designed to deform and deflect in response to a threshold amount of impact energy, and they are not intended to function as stiff and rigid non-deformable structural beams. These malleable and deformable reinforcing features are suitably configured to enhance fail safety of crown panel 500 and to absorb and dissipate the impact energy caused by bird strikes and other impact hazards. In addition, these reinforcing features serve as crack resistant members that function to impede crack growth that might originate in the thinner sections of crown panel 500. In this embodiment the reinforcing features are formed from the monolithic one-piece material, however other embodiments may utilize separate fastened or bonded straps as crack arrestment features. Such features would be similar to those described and depicted for the forward pressure bulkhead.

As described above with reference to FIG. 8 and FIG. 9, an aircraft may include a number of window posts for the cockpit windows. In this regard, the transverse reinforcing features of crown panel 500 may be suitably configured for alignment with such window posts. For example, right transverse reinforcing feature 518 is located such that it aligns with a right window post after installation, left transverse reinforcing feature 520 is located such that it aligns with a left window post after installation, and center transverse reinforcing feature 522 is located such that it aligns with a center window post after installation. This configuration is desirable because it establishes continuous load paths from the window posts to remaining structure of the aircraft. This window post alignment is illustrated in FIG. 8—right transverse reinforcing feature 518 is positioned such that it serves as an "extension" of right window post 404, left transverse reinforcing feature 520 is positioned such that it serves as an "extension" of left window post 406, and center transverse reinforcing feature 522 is positioned such that it serves as an "extension" of center window post 408. The transverse reinforcing features are depicted in dashed lines in FIG. 8 because they would otherwise not be visible.

Each transverse reinforcing feature is preferably formed with a tapered cross section, as depicted in FIG. 14 (which is a cross sectional view of center transverse reinforcing feature 522 taken along line C-C in FIG. 12). This tapered cross section is desirable to enable the transverse reinforcing features to be compliant and malleable, while resistant to ripping or tearing at the junctions with the thinner sections of crown panel 500. For this embodiment, center transverse reinforcing feature 522 maintains the nominal thickness 524 of the monolithic material along its longitudinal transverse axis. Notably, center transverse reinforcing feature 522 gradually becomes thinner on both sides until it reaches the primary area of crown panel 500, which represents a relatively thin section. In this example, center transverse reinforcing feature 522 tapers down to a thickness of about 0.175 inches (which corresponds to the thickness of the primary area of crown panel 500). Reference number 526 in FIG. 13 represents this 0.175 inch thickness.

The taper angle need not be uniform along the length of a transverse reinforcing feature, the taper angle need not be uniform for all transverse reinforcing features, and the taper angle profile of a transverse reinforcing feature need not be the same on both sides. For example, the taper angle of center transverse reinforcing feature 522 may be less than the taper angle of right transverse reinforcing feature 518 and left transverse reinforcing feature 520 to accommodate more deformation near the middle of crown panel 500. As another example, the taper angle on the inner side of right/left transverse reinforcing feature 518/520 may be steeper than the taper angle on the outer side of right/left transverse reinforcing feature 518/520. The tapers are used for two primary purposes. First, there is a minimum required taper angle to meet fatigue requirements. In this embodiment, the reinforcing features 518, 520, and 522 are in a zone which has relatively more compliance than the edges 506, 508, and 510. These perimeter edge areas are adjacent to stiffening members required for cockpit window surround and escape hatch features and are therefore less compliant. As such, in flight damage such as that caused by bird strike is much more likely near the perimeter. The crown panel can be designed and configured to tailor the gradation of the taper in each particular zone. If the gradation near a stiffening feature such as a frame is too steep, penetration may be more likely where the "basic" skin gauge meets the taper. Reinforcing features 518, 520, and 522 are tapered at the minimum required gradation for fatigue. The tapering characteristics and profiles of the transverse reinforcing features can be adjusted according to the anticipated impact loading and according to the desired deflection and deformation characteristics of crown panel 500.

As mentioned above, this embodiment of crown panel 500 is formed from a monolithic one-piece material (such as aluminum) having a nominal thickness. The transverse reinforcing features may be integrally formed in crown panel 500 by selective removal of material and reduction of the nominal thickness near the malleable and deformable transverse reinforcing features. In other words, material from the stock material is selectively removed such that the remaining material defines the transverse reinforcing features and, if applicable, the tapered cross sectional characteristics of the transverse reinforcing features. In accordance with one practical embodiment where the monolithic one-piece material is a metal, the transverse reinforcing features are chemically etched into the material. Referring to FIG. 12 and FIG. 13, multiple masking and etching steps may be utilized to form the stepwise and gradual taper described above.

Referring again to FIG. 8 and FIG. 9, crown panel 500 may be configured such that forward edge 506, side edges 508, and aft edge 510 (or areas near these edges) are coupled to various frame support structures of the aircraft. Thus, forward edge reinforcing feature 512, side edge reinforcing features 514, and aft edge reinforcing feature 516 may be suitably configured for coupling to respective frame support structures. For example, forward edge reinforcing feature 512 may be designed to be coupled to aft window frame support structure 410 depicted in FIG. 9. These edge reinforcing features provide additional structural support for the transition between the main compliant area of crown panel 500 and the rigid and non-compliant frame structure of the aircraft. Moreover, these edge reinforcing features may be configured to accommodate fasteners used to install crown panel 500 (e.g., aluminum or titanium bolts, screws, or rivets).

For this embodiment of a crown panel, forward edge reinforcing feature 512, side edge reinforcing features 514, and aft edge reinforcing feature 516 are integrally formed in the monolithic one-piece material used for crown panel 500. These edge reinforcing features are preferably formed in the manner described above for the transverse reinforcing features. Common features, characteristics, and manufacturing techniques will not be redundantly described here in the context of the edge reinforcing features.

Briefly, the edge reinforcing features may be formed in the monolithic one-piece material by selective removal of material as described above. FIG. 13 is a cross sectional view of aft edge reinforcing feature 516 as viewed from line B-B in FIG. 12. FIG. 13 illustrates one suitable tapering profile for aft edge reinforcing feature 516. Notably, aft edge reinforcing feature 516 transitions from the nominal thickness 524 to the reduced thickness 528 that represents the thickness of the primary compliant area of crown panel 500.

In contrast to the transverse reinforcing features, the edge reinforcing features need not be malleable and deformable because they serve as the mounting boundary of crown panel 500. This mounting boundary joins the rigid and non-deformable support structure of the aircraft. Therefore, the edge reinforcing features are preferably configured to provide a stiff and rigid outer perimeter for crown panel 500. In practical embodiments, crown panel 500 may be designed to flex at the center as much as possible without causing impact with critical equipment mounted under crown panel 500, in contrast to the perimeter, which may flex only minimally due to integrated reinforcement features.

The tapered profile of the edge reinforcing features is utilized to provide a transition between the compliant primary area of crown panel 500 and the perimeter of crown panel 500. In certain embodiments, the tapering of the edge reinforcing features can be blended with the tapering of the transverse reinforcing features (see FIG. 12). Moreover, as described above for the transverse reinforcing features, the taper angle of an edge reinforcing feature need not be uniform along its length, the taper angle need not be uniform for all edge reinforcing features, and the taper angle profile of an edge reinforcing feature need not be the same on both sides. The tapering characteristics and profiles of the edge reinforcing features can be adjusted according to the anticipated impact loading, the desired deflection and deformation characteristics of crown panel 500, and the intended installation environment for crown panel 500.

Crown panel 500 can be manufactured in the following manner. The stock of material (e.g., an aluminum plate) is cut into the desired size and shape. The material is then stretch-formed over an appropriately configured tool until the material assumes the desired contoured shape. At this point the material can be machined to form the desired edge profile and to form holding tabs that will be used for the chemical etching process. Thereafter, the reinforcing features can be formed via a suitable chemical etching process, which may involve multiple masking and etching steps. After completion of the chemical etch, the material is cleaned and the holding tabs are removed. In this manner, the monolithic one-piece material is transformed into crown panel 500. It should be appreciated that alternative manufacturing techniques and different processing steps may be utilized to form crown panel 500; this brief description represents only one possible manufacturing technique.

An alternate embodiment of a crown panel having the compliant characteristics described herein may be realized with a composite construction having an inner skin and an outer skin. For example, certain embodiments may be formed from a laminate composite construction that does not include a core, while other embodiments may be formed from a construction having an inner skin, and outer skin, and a core material sandwiched between the skins. The structure may be an unstiffened, honeycomb-stiffened, or core-stiffened panel designed to invert or deform on impact. A metallic embodiment utilizes aluminum skins and an aluminum honeycomb core, where crushing of the core absorbs the impact energy of a foreign object strike. In such an embodiment, a pad-up or other reinforcing feature is included around the perimeter (as described above for the monolithic embodiment) to prevent penetration in noncompliant areas.

A composite embodiment may utilize carbon fiber skins and a suitable core material between the skins. In such a composite embodiment, extra plies or layers of material may be required around the perimeter in order to contain impact in noncompliant areas. Alternatively, laminate strips could be bonded around the perimeter. In addition, the use of a deformable hinge along the perimeter would allow both the composite and composite honeycomb embodiments to better absorb the impact with minimal damage. Functionally, a deformable hinge can be created with any metal that offers a failure strain high enough to plastically deform without fracture through the required rotational deflection of the hinge. The rotational deflection angle will depend on the convexity of the crown panel. If the dome makes an angle theta with its chord, then the required angular deflection will be twice theta. In this embodiment, the frame aft of the crown panel provides a convenient attachment point and with proper material selection, a deformable hinge.

In the composite embodiment additional plies can be interleaved in order to provide fail safety against a running crack while in the composite honeycomb embodiment tear straps may not be required due to the redundancy provided by dual skins (i.e., the inner and outer face sheets).

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An energy absorbing skin for an aircraft, the energy absorbing skin comprising:
    a malleable panel that is configured to deform in response to a predetermined threshold amount of impact energy caused by a foreign object strike so as to absorb at least a portion of the impact energy, the energy absorbing skin being void of any rigid non-deformable frame members inward of edges of said malleable panel;
    said malleable panel is a monolithic one-piece material and further comprises a relatively thicker reinforcing feature including a first reinforcing feature extending along edges of the malleable panel and a second reinforcing feature extending transverse to the malleable panel, the reinforcing feature being stiffer than the malleable panel, and
    the malleable panel and the reinforcing feature configured so that both the malleable panel and the reinforcing feature deform in response to the predetermined threshold amount of impact energy.

2. The energy absorbing skin according to claim 1, wherein the malleable panel is a crown panel.

3. The energy absorbing skin according to claim 1, wherein the monolithic one-piece material is aluminum.

4. The absorbing skin according to claim 1, wherein:
    the monolithic one-piece material has a nominal thickness.

5. The energy absorbing skin according to claim 1, wherein the at least one reinforcing feature comprising the malleable panel comprises a deformable reinforcing feature being configured to enhance fail safety of the energy absorbing skin.

6. The energy absorbing skin according to claim 1, wherein:
    the malleable panel comprises a convex outer surface and a concave inner surface;
    the malleable panel is configured to withstand pressurized air loading applied to the concave inner surface relative to ambient air pressure exposed to the convex outer surface, and wherein the shape of the malleable panel substantially corresponds to a dome section.

7. The energy absorbing skin according to claim 1, wherein the malleable panel is seamless.

8. The energy absorbing skin according to claim 1, wherein an angle of said taper is different for at least two of said reinforcing features.

9. The energy absorbing skin according to claim 1, wherein an angle of said taper is nonuniform along a length of said reinforcing feature.

10. The energy absorbing skin according to claim 1, wherein said reinforcing feature comprises said taper on each side of said reinforcing feature.

11. The energy absorbing skin according to claim 1, wherein an angle of said taper is different on said each side of said reinforcing feature.

12. The energy absorbing skin for an aircraft of claim 1, wherein the reinforcing feature is tapered.

13. An energy absorbing crown panel for an aircraft configured to deform in response to a predetermined threshold amount of impact energy caused by a foreign object strike, said energy absorbing skin comprising:
    a malleable panel without any rigid non-deformable frame members inward of edges of said malleable panel;
    said malleable panel comprises a monolithic one-piece material having a relatively thicker reinforcing feature including a first reinforcing feature extending along edges of the malleable panel and a second reinforcing feature extending transverse to the malleable panel, the reinforcing feature being stiffer than the malleable panel; and
    the malleable panel the reinforcing feature configured so that both the malleable panel and the reinforcing feature deform in response to the predetermined threshold amount of impact.

14. The energy absorbing crown panel according to claim 13, wherein the monolithic one-piece material is aluminum.

15. The energy absorbing crown panel according to claim 13, wherein:
    the malleable panel comprises a convex outer surface and a concave inner surface;
    the malleable panel is configured to withstand pressurized air loading applied to the concave inner surface relative to ambient air pressure exposed to the convex outer surface, and wherein the shape of the malleable panel substantially corresponds to a dome section.

16. The energy absorbing crown panel according to claim 13, wherein the malleable panel is seamless.

17. The energy absorbing crown panel according to claim 13, wherein an angle of said taper is different for at least two of said reinforcing features.

18. The energy absorbing crown panel according to claim 13, wherein an angle of said taper is nonuniform along a length of said reinforcing feature.

19. The energy absorbing crown panel according to claim 13, wherein said reinforcing feature comprises said taper on each side of said reinforcing feature.

20. The energy absorbing crown panel according to claim 13, wherein an angle of said taper is different on said each side of said at reinforcing features.

21. The energy absorbing crown panel according to claim 13, wherein the reinforcing feature is tapered.

* * * * *